US012693479B2

(12) United States Patent
Limbert et al.

(10) Patent No.: US 12,693,479 B2
(45) Date of Patent: Jul. 28, 2026

(54) FIBRE OPTIC CONNECTOR

(71) Applicant: Ridgemount Technologies Ltd,
Oxfordshire (GB)

(72) Inventors: Mark John Limbert, Oxfordshire
(GB); Christopher Russell Peters,
Oxfordshire (GB)

(73) Assignee: Ridgemount Technologies Ltd,
Oxfordshire (GB)

( * ) Notice: Subject to any disclaimer, the term of this
patent is extended or adjusted under 35
U.S.C. 154(b) by 213 days.

(21) Appl. No.: 18/599,928

(22) Filed: Mar. 8, 2024

(65) Prior Publication Data

US 2025/0251554 A1      Aug. 7, 2025

(30) Foreign Application Priority Data

Feb. 1, 2024     (GB) ...................................... 2401305

(51) Int. Cl.
*G02B 6/38*                 (2006.01)
(52) U.S. Cl.
CPC .................................... *G02B 6/389* (2013.01)
(58) Field of Classification Search
CPC ...................................................... G02B 6/389
USPC ............................................................ 385/86
See application file for complete search history.

(56) References Cited

U.S. PATENT DOCUMENTS

| 4,729,625 | A | 3/1988 | Loscoe et al. | |
| 5,136,672 | A | 8/1992 | Mulholland et al. | |
| 6,134,370 | A | * 10/2000 | Childers | G02B 6/4478 |
| | | | | 385/86 |
| 7,048,447 | B1 | * 5/2006 | Patel | G02B 6/3885 |
| | | | | 385/59 |
| 2007/0230874 | A1 | 10/2007 | Lin | |
| 2009/0080839 | A1 | 3/2009 | Yazaki et al. | |
| 2010/0098381 | A1 | * 4/2010 | Larson | G02B 6/3888 |
| | | | | 385/60 |
| 2010/0273338 | A1 | 10/2010 | Shu et al. | |
| 2017/0285273 | A1 | 10/2017 | Abe et al. | |
| 2020/0003960 | A1 | 1/2020 | Hsu et al. | |
| 2020/0012063 | A1 | * 1/2020 | Lambert | G02B 6/46 |

OTHER PUBLICATIONS

Website: Facebook video "Hexatronic—Introducing Hexatronic's
new Fibre-In-Duct solution, a PIA-approved drop Cable assembly
suitable for overhead, through existing ducts, and direct buried
applications.", Jun. 18, 2024, URL. https://fb.watch/uE4-jS7QwQ/.
GB Search Report for Application No. GB2401305.4, www.gov.
uk/ipo, 2 pages.

* cited by examiner

*Primary Examiner* — Jerry M Blevins
(74) *Attorney, Agent, or Firm* — Heslin Rothenberg
Farley & Mesiti P.C.

(57)                 ABSTRACT

According to the present invention, there is provided a
connector for attachment to the end of an optical fibre; the
connector comprising a rear body and a resilient biasing
member; wherein the rear body comprises a longitudinal slot
configured to allow a cable to be inserted; wherein the rear
body comprises a transverse slot configured to receive the
resilient biasing member, wherein the resilient biasing mem-
ber has a shape configured to allow a cable to be inserted the
longitudinal slot. A kit of parts comprising the connector is
also described.

13 Claims, 6 Drawing Sheets

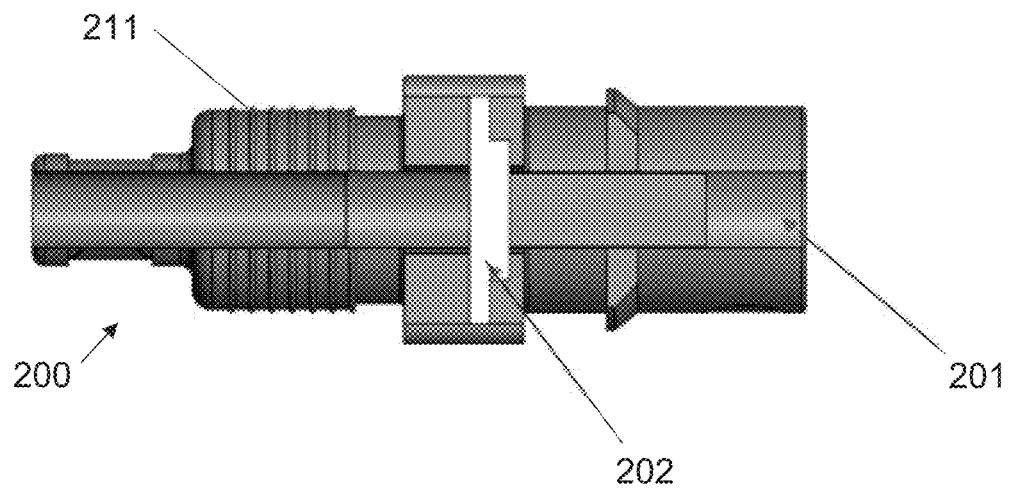
FIG. 1
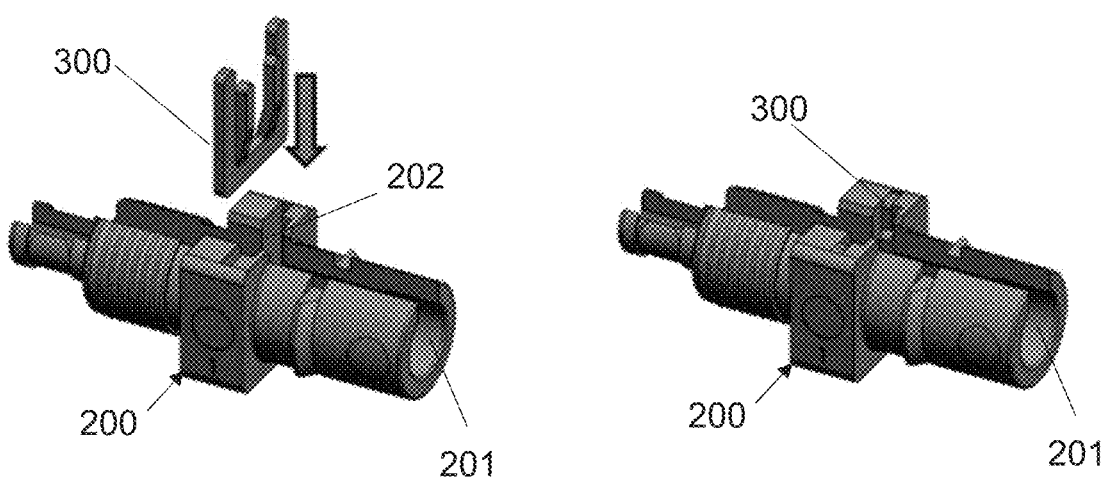
FIG. 2A                                        FIG.2B

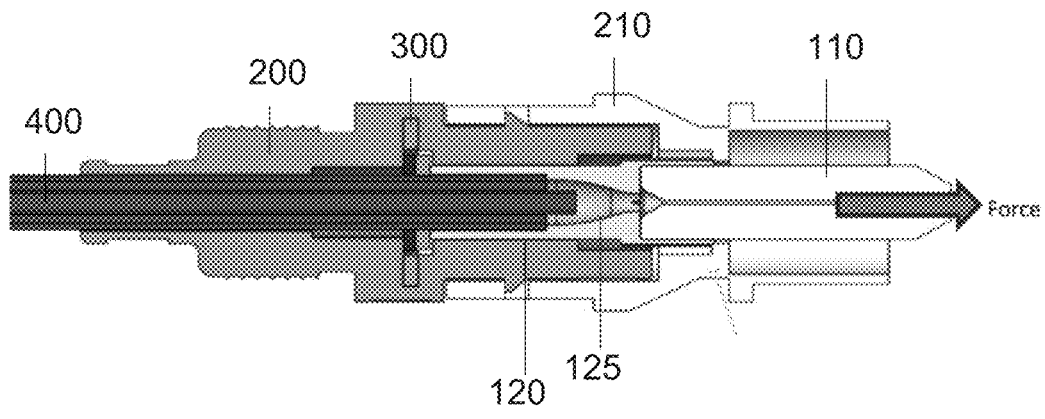
FIG. 5
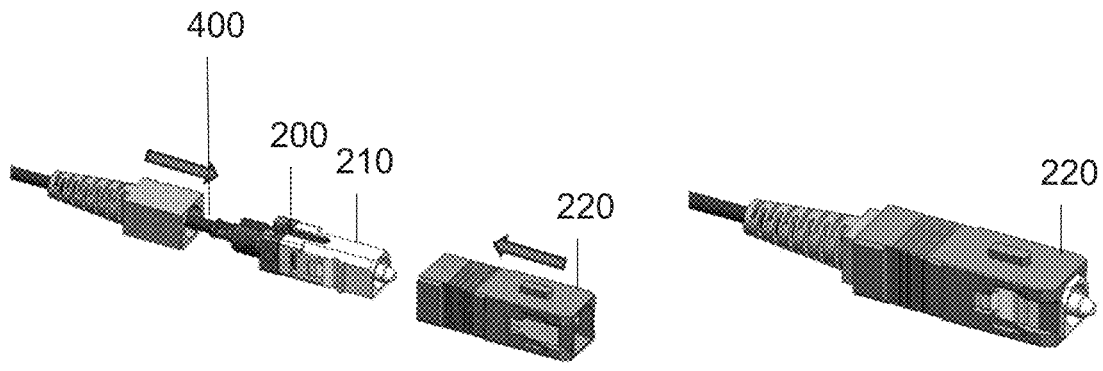
FIG. 6A                    FIG. 6B

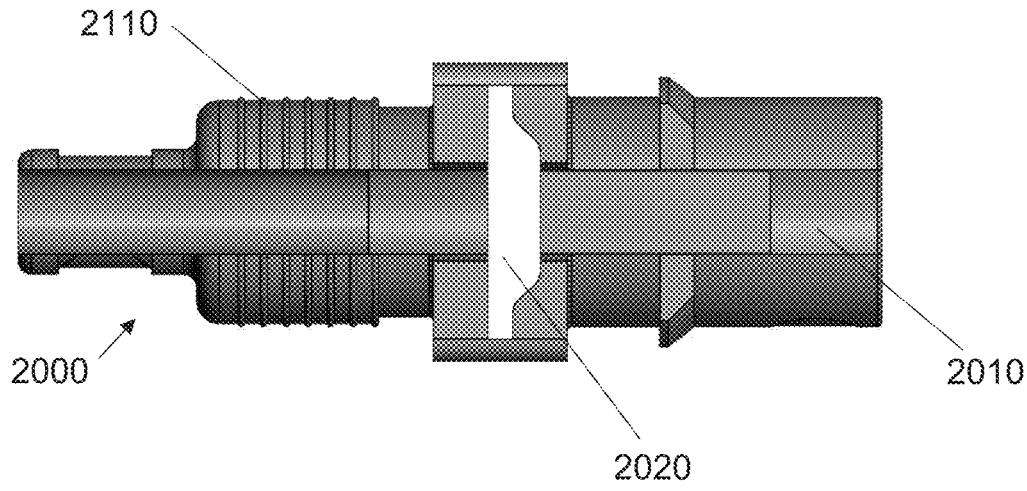
FIG. 7
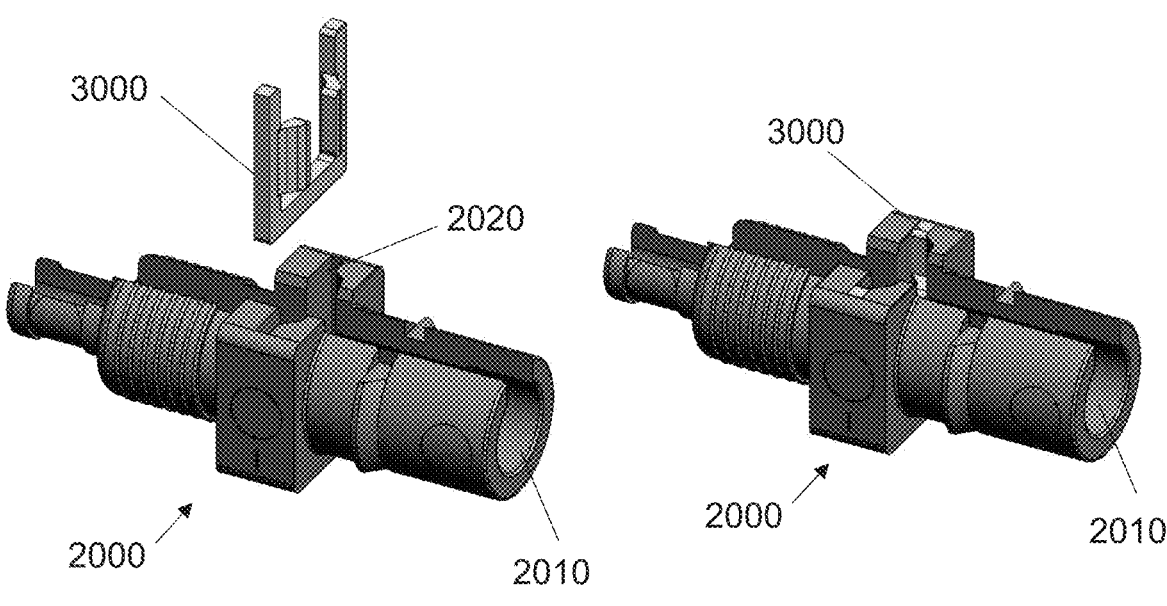
FIG. 8A                              FIG.8B

FIBRE OPTIC CONNECTOR

CROSS-REFERENCE TO RELATED APPLICATION

This application claims priority to United Kingdom Application No. 2401305.4, filed Feb. 1, 2024, and entitled "Fibre Optic Connector," which is incorporated herein by reference in its entirety.

FIELD OF THE INVENTION

The present invention relates to a fibre optic connector, and more particularly to a fibre optic connector for attachment to the end of an optical fibre.

BACKGROUND OF THE INVENTION

Optical fibres are frequently installed with the use of installation tubes. Here, in the first step of the installation process, an installation tube is positioned between two locations to carry an optical fibre to the desired destination. As the installation tube is put in place, the curvature of the tube at any specific position may be reviewed, ensuring the radius of curvature does not extend beyond the operational limits of the optical fibre to be inserted. In this way, the reliability of the optical fibre may be improved.

Subsequently, the optical fibre is fed through the installation tube. The optical fibre may be fed through the installation tube using a variety of methods, for example via traditional cable pulling using a winch line. However, more recently, cable jetting or blowing has also been used to feed optical fibres through an installation line.

In the process of cable jetting, the optical fibre is blown through the installation tube with the use of compressed air. Here, compressed air is introduced at an opening in the installation tube, such that it flows along the installation tube at high speed. Where the optical fibre is inserted into the installation tube, the high-speed air propels the optical fibre due to both the associated drag forces and pressure drop along the length of the installation tube. The friction of the optical fibre against the installation tube is reduced by the airflow, which acts as a buffer between the optical fibre and the installation tube.

When using cable jetting or blowing, the airflow expands down the length of the installation tube. As such, the propelling force due to the action of the air is relatively small at the opening, and relatively large at the air exhaust end of the installation tube. To compensate for this effect, a pushing force is often exerted on the optical fibre by supplementary equipment, increasing the maximum jetting distance considerably.

However, using existing techniques, jetting is not suitable for all kinds of optical fibre. For example, the installation of pre-assembled, industry standard, fibre optic interface (SC connectors) via jetting through an installation tube remains an impossibility. Here the large, bulky SC connector (Standard Connector or Subscriber Connector) located at the end or terminus of the optical fibre is too large to enter into the installation tube, and hence the jetting process cannot be used for installation.

Additionally, there is a desire for connectors which can be used in a similar manner to those of GB 2558567 which are suitable for larger fibres.

SUMMARY OF THE INVENTION

According to a first aspect of the present invention, there is provided a fibre optic blowing accessory as claimed in claim 1.

In this way, there is provided a blowing or jetting accessory for attachment to the end of an optical fibre that allows an optical fibre suitable for FTTH connection to terminate directly into the rear of the connector. In this way, there is provided a fibre optic blowing accessory that allows for a strong and robust connection between the ferrule and a termination piece without the need for a spring. The resilient biasing member located in the transverse slot of the connector rear body provides the required force and deflection when the ferrule is terminated in the housing. Additionally, the transverse slot in the rear body reduces the volume of material in the rear body and therefore reduces the potential of bowing.

Preferably, the longitudinal slot has a diameter in the range of 0.90 to 2.00 mm. More preferably, the longitudinal slot has a diameter in the range of 1.05 mm to 2.00 mm. More preferably, the longitudinal slot has a diameter in the range of 1.50 to 2.00 mm. More preferably, the longitudinal slot has a diameter in the range of 1.83 to 2.00 mm. More preferably, the longitudinal slot has a diameter in the range of 1.85 mm to 1.95 mm.

Preferably, the connector does not comprise a spring extending from the ferrule holder. In this way, the size of the ferrule to be attached is not limited by the internal diameter a spring extending from the ferrule holder.

Preferably, the resilient biasing member is a resilient biasing clip, wherein the resilient biasing clip comprises a deflectable tine. In this way, the deflectable tine provides the required force and deflection when the ferrule is terminated in the housing.

Preferably, the resilient biasing clip is substantially symmetrical. In this way, the required force and deflection is provided substantially equally either side of the ferrule on insertion.

Preferably, the resilient biasing clip comprises two deflectable tines. More preferably, the two deflectable tines are located at either side of the longitudinal slot. In this way, the required force and deflection is provided either side of the ferrule on insertion.

Preferably, the resilient biasing clip is substantially U-shaped. In this way, the resilient biasing clip can sit flush in the transverse slot and provide rigidity to the rear body. In some embodiments, the two deflectable tines extend from the base of the resilient biasing clip. In alternative embodiments, the two deflectable tines extend from the sides of the resilient biasing clip.

Preferably the resilient biasing clip has a thickness in the range of 0.1 to 0.7 mm. More preferably, the resilient biasing clip has a thickness in the range of 0.1 to 0.5 mm. More preferably, the resilient biasing clip has a thickness in the range of 0.1 to 0.3 mm. For the avoidance of doubt, the thickness of the resilient biasing clip is defined as the distance through the resilient biasing clip in the longitudinal direction of the rear body when the resilient biasing clip is inserted into the rear body.

Preferably, the resilient biasing member comprises stainless steel or beryllium copper. Preferably, the resilient biasing member is integrally formed in one piece. In some embodiments, the resilient biasing member is integrally formed in one piece as part of the rear body.

Preferably, the transverse slot of the rear body has a cross section formed of a first and second rectangle, wherein the first rectangle has a greater length than the second rectangle and the first and second rectangles both have lengths greater than the diameter of the longitudinal slot. In this way, when the ferrule is inserted into the rear body while the resilient biasing clip is inserted into the transverse slot, the deflectable tines of the resilient biasing clip will contact the edge of the transverse slot. In this way, when a housing is fitted, the deflection from the resilient biasing clip will provide a forward force.

Preferably, the resilient biasing member is configured to deflect and provide a resultant force of 5 to 12 N when a shroud is fitted.

Preferably, the connector further comprises a ferrule holder, the ferrule holder having an internal bore. More preferably, the ferrule holder comprises an internal bore and wherein the internal bore has a tapered end. In this way, the internal bore of the ferrule holder guides the fibre into the termination piece.

More preferably, the tapered end of the internal bore of the ferrule holder is curved. In this way, the tapered end of the internal bore of the ferule holder helps to guide the fibre into a termination piece with reduced stress. Preferably, the tapered end of the internal bore of the ferrule holder is tapered in a concave curve. In this way, the tapered end of the ferrule is curved to match the transition path of the fibre into a termination piece in order to further reduce the stress on the fibre.

Preferably, a portion of the rear body comprises an asymmetric D profile. Preferably, a portion of the ferrule holder comprises an asymmetric D profile. More preferably, the rear body and the ferrule holder each comprise a complementary D profile. In this way, it is ensured that the correct orientation of the fibre optic ferrule connection is achieved and angular rotation of the SC connector around the longitudinal axis of the optical fibre is minimised.

In some embodiments, the connector is an SC connector. In alternative embodiments, the connector is an LC connector.

Preferably, the ferrule holder comprises a plurality of longitudinal grooves or channels. In this way, the groove or channels create an air cushion around the accessory during a blowing or jetting process. As such, friction between the accessory and an installation tube is reduced, increasing the ease with which an attached optical fibre may be installed.

In addition to the provision of the air cushion, the presence of a grooved surface on the ferule holder results in a reduced contact area between the accessory and any installation tube, resulting in a further reduction in friction. Therefore, the use of a fibre optic blowing accessory may prove advantageous in providing reduced friction, improved speed of deployment and greater potential installation range when installing an optical fibre.

Preferably, the plurality of grooves or channels run parallel to one another. Preferably the plurality of grooves run substantially parallel to a longitudinal axis of the ferrule holder. More preferably, the plurality of grooves run parallel to a longitudinal axis of the ferrule holder.

Preferably, a majority of the grooves which comprise the plurality of grooves are equally distributed around a perimeter of the ferrule holder. More preferably, the grooves which comprise the plurality of grooves are equally distributed around a perimeter of the ferrule holder. Preferably, a majority of the grooves which comprise the plurality of grooves are evenly spaced around a perimeter of the ferrule holder. More preferably, the grooves which comprise the plurality of grooves are evenly spaced around a perimeter of the ferrule holder.

Preferably the plurality of grooves comprises at least 4 grooves, more preferably comprises at least 8 grooves, still more preferably comprises at least 16 grooves, even more preferably comprises at least 24 grooves and most preferably comprises at least 32 grooves.

Preferably, the plurality of grooves extends longitudinally along the majority of the outer surface of the ferrule holder. More preferably, the plurality of grooves extends longitudinally along the entire outer surface of the ferrule holder.

Preferably, the connector comprises a dust cap covering the termination piece. Both the ferrule holder and the dust cap comprise a plurality of grooves extending longitudinally along a portion of their outer surfaces.

Preferably, the ferrule holder or the dust cap comprises engagement means to locate the ferrule holder and the dust cap in a position adjacent each other. More preferably, this engagement means is a tab or member extending from the dust cap, to be located within a slit or recess in the ferrule holder. Alternatively, this engagement means is a tab or member extending from the ferrule holder, to be located within a slit or recess in the dust cap.

More preferably, the engagement means locates the ferrule holder and the dust cap in a position such that the plurality of grooves extends substantially continuously across both the dust cap and the ferrule holder.

Preferably, the grooves which comprise the plurality of grooves have a semi-circular cross section. Preferably, the grooves have a smooth surface. Preferably, the cross section of the groove has a constant radius of curvature along at least one of its sides.

Preferably, the connector is attached to an optical fibre. More preferably the connector is factory fitted to an optical fibre. Here, we define factory fitted to mean where the connector is attached to the optical fibre in a workshop environment, more preferably an industrialised workshop environment. Most preferably, the fibre optic blowing accessory is attached to an optical fibre to provide a 'plug-and-play' accessory, where no splicing of the optical fibre or adjustment of the optical parameters of the fibre optic blowing accessory are required at the site where the optical fibre is to be installed.

According to a second aspect of the invention, there is provided a kit of parts.

According to a third aspect of the present invention, there is provided a method of installing an optical fibre in an installation tube. The method comprises providing an optical fibre terminated in a connector; inserting the end of the optical fibre terminated with the connector into an installation tube; and providing a source of compressed air to the installation tube, such that the both the connector and the attached optical fibre are blown down the length of the installation tube. As such, an improved method of installing an optical fibre is provided which can be used for optical fibres suitable for FTTH connections.

According to a fourth aspect of the invention, there is provided a connector for attachment to the end of an optical fibre; the connector comprising a rear body and a ferrule holder, the ferrule holder comprising an internal bore. Preferably, the internal bore of the ferrule holder has a tapered end. In this way, the internal bore of the ferrule holder guides the fibre into a termination piece. More preferably, the tapered end of the internal bore of the ferrule holder is curved. In this way, the tapered end of the internal bore of the ferule holder helps to guide the fibre into a termination piece with reduced stress. Preferably, the tapered end of the internal bore of the ferrule holder is tapered in a concave curve. In this way, the tapered end of the ferrule is curved to match the transition path of the fibre into a termination piece in order to further reduce the stress on the fibre.

Preferably, the fibre optic blowing accessory has an outer diameter between 75% and 85% of the inner diameter of the elongate installation tube.

According to a fifth aspect of the present invention, there is provided a connector for attachment to the end of an optical fibre; the connector comprising a rear body and a resilient biasing member, wherein the rear body comprises a longitudinal slot configured to allow a cable to be inserted the rear body and the resilient biasing member are integrally formed.

Herein, integrally formed should be understood to mean formed as a single piece. For example, the rear body and the resilient biasing member may be moulded in a single process.

DETAILED DESCRIPTION OF THE DRAWINGS

Embodiments of the present invention will now be described by way of example only and with reference to the accompanying drawings, in which:

FIG. 1 is a schematic view of a rear body in accordance with a first embodiment of the present invention;

FIG. 2A is a schematic view of a resilient biasing clip and a rear body in accordance with a first embodiment of the present invention, and FIG. 2B is a schematic view of a rear body with the resilient biasing clip inserted, in accordance with a first embodiment of the present invention;

FIG. 5 is a schematic cross-sectional view of the embodiment of FIG. 3 with a housing fitted, in accordance with a first embodiment of the present invention;

FIGS. 6A and 6B are schematic views of the ferrule assembly before and after it is complete, in accordance with a first embodiment of the present invention;

FIG. 7 is a schematic view of a rear body, in accordance with a second embodiment of the present invention;

FIG. 8A is a schematic view of a resilient biasing clip and a rear body, in accordance with a second embodiment of the present invention;

FIG. 8B is a schematic view of a rear body with a second embodiment of the resilient biasing clip inserted, in accordance with the present invention;

DETAILED DESCRIPTION FOR CARRYING OUT THE INVENTION

Figure 3:
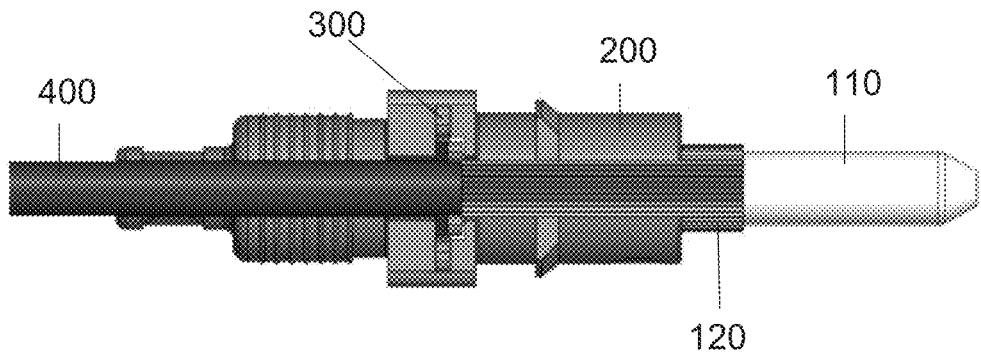
FIG. 3 is a schematic view of a rear body, with the resilient biasing clip and the ferrule inserted, in accordance with a first embodiment of the present invention.

Referring to FIG. 1 of the drawings, there is shown an SC connector rear body 200 with the longitudinal slot 201 and the transverse slot 202. In this embodiment, the transverse slot 202 of the rear body 200 has a cross section formed of a first and second rectangle, wherein the first rectangle has a greater length than the second rectangle and the first and second rectangles both have lengths greater than the diameter of the longitudinal slot 201. In this embodiment of the invention, the outer surface of the SC rear portion 200 comprises ribs or ridges 211.

FIG. 2A shows the SC connector rear body 200 of FIG. 1 with the resilient biasing clip 300 above prior to insertion and FIG. 2A shows the SC connector rear body 200 of FIG. 1 with the resilient biasing clip 300 inserted. The resilient biasing clip 300 is an interference fit into the transverse slot 202 located in the SC connector rear body 200. The resilient biasing clip 300 sits flush with the bottom face of the transverse slot 202 of the SC connector rear body 200. The resilient biasing clip 300 is substantially U-shaped and is configured not to block the longitudinal slot 201 of the SC connector rear body 200.

Figure 4:
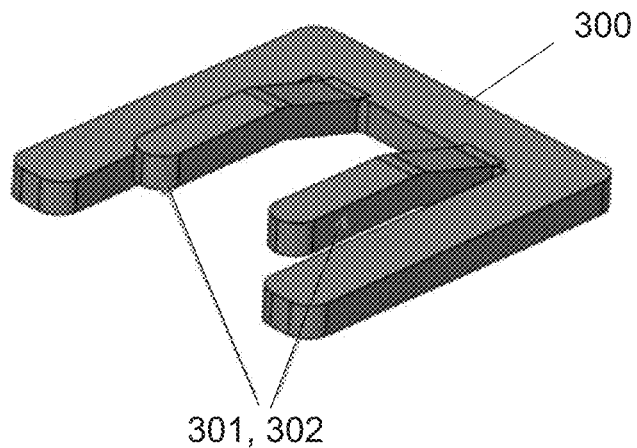
FIG. 4 is a schematic view of a resilient biasing clip, in accordance with a first embodiment of the present invention.

The resilient biasing clip 300 is also shown FIG. 4. The resilient biasing clip 300 has two deflectable tines 301 and 302. The deflectable tines 301 and 302 are located within the U-shape of the resilient biasing clip 300, extend from the base of the resilient biasing clip 300, and are free to deflect when inserted into the SC connector rear body 200.

FIG. 3 shows the SC connector rear body 200 with the resilient biasing clip 300 and the ferrule 400 inserted. The ferrule holder 120 and the termination piece 110 are also shown. The ferrule holder 120 comprises a plurality of grooves, indentations, or ridges 121. This plurality of grooves 121 extends longitudinally along the ferrule holder 120, such that the plurality of grooves 121 cover the majority of the surface of the ferrule holder 120. Each of the grooves which form the plurality of grooves 121 are parallel with one another, forming a series of linear, parallel indentations or channels which extend longitudinally along the outer surface of the ferrule holder 120. In this connection, the asymmetric D profile of the ferrule holder 120 is located and aligned with the corresponding section of the SC rear body 200. This process ensures the correct orientation of the fibre optic ferrule connection is achieved and minimises angular rotation of the SC connector around the longitudinal axis of the optical fibre.

FIG. 5 is a schematic cross sectional view of the embodiment of FIG. 3 with a housing 210 fitted. This housing 210 is connected or fixed to the SC rear body 200 such that it surrounds the SC rear body 200, in this case substantially enclosing part of the SC rear body 200. The arrow of FIG. 5 shows the forward force provided by the deflection from the resilient biasing clip. The internal bore 125 of the ferrule holder 120, has a concave curved tapered end to guide the fibre into the termination piece 110 with reduced stress.

Referring to FIGS. 6A and 6B, the shroud 220 is fitted over the housing 210 to form a complete ferrule assembly, a complete SC connector plug. When the shroud is fitted, the ferrule assembly will deflect back approximately 0.4 mm onto the resilient biasing clip giving a resultant force of approximately 10 N.

Referring to FIG. 7 of the drawings, there is shown an SC connector rear body 2000 with the longitudinal slot 2010 and the transverse slot 2020. In this embodiment, the transverse slot 2020 has a cross section formed of a rectangle and a trapezoid with rounded corners, wherein the rectangle has a greater length than the base of the trapezoid and the rectangle and the trapezoid both have lengths greater than the diameter of the longitudinal slot 2010. In this embodiment of the invention, the outer surface of the SC rear portion 2000 comprises ribs or ridges 2110.

FIG. 8A shows the SC connector rear body 2000 of FIG. 1 with the resilient biasing clip 3000 above prior to insertion and FIG. 8A shows the SC connector rear body 2000 of FIG. 7 with the resilient biasing clip 3000 inserted. The resilient biasing clip 3000 is an interference fit into the transverse slot 2020 of the SC connector rear body 2000. The resilient biasing clip 3000 sits flush with the bottom face of the transverse slot 2020 of the SC connector rear body 2000. The resilient biasing clip 3000 is substantially U-shaped and is configured not to block the longitudinal slot 2010 of the SC connector rear body 2000.

Figure 10:
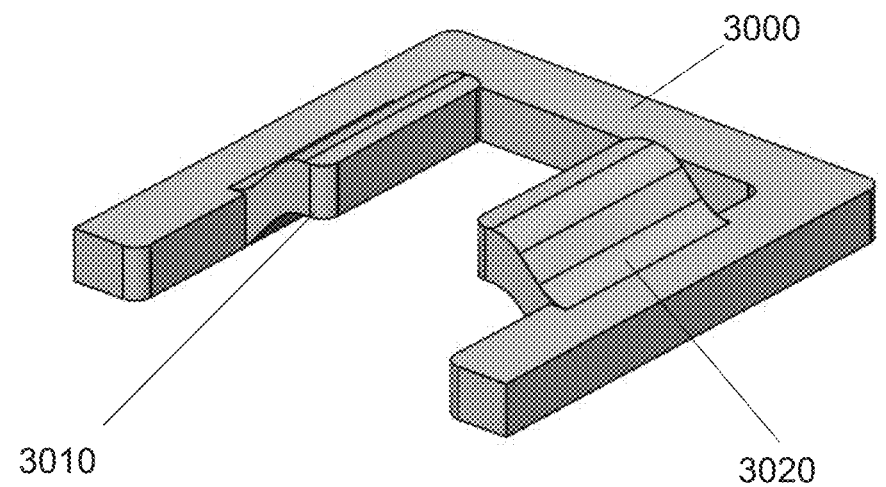
FIG. 10 is a schematic view of a resilient biasing clip, in accordance with a second embodiment of the present invention.

The resilient biasing clip 3000 is also shown FIG. 10. The resilient biasing clip 3000 has two deflectable tines 3010 and 3020. The deflectable tines 3010 and 3020 are located within the U-shape of the resilient biasing clip 3000, extend from the sides of the resilient biasing clip 3000, and are free to deflect when inserted into the SC connector rear body 2000.

Figure 9:
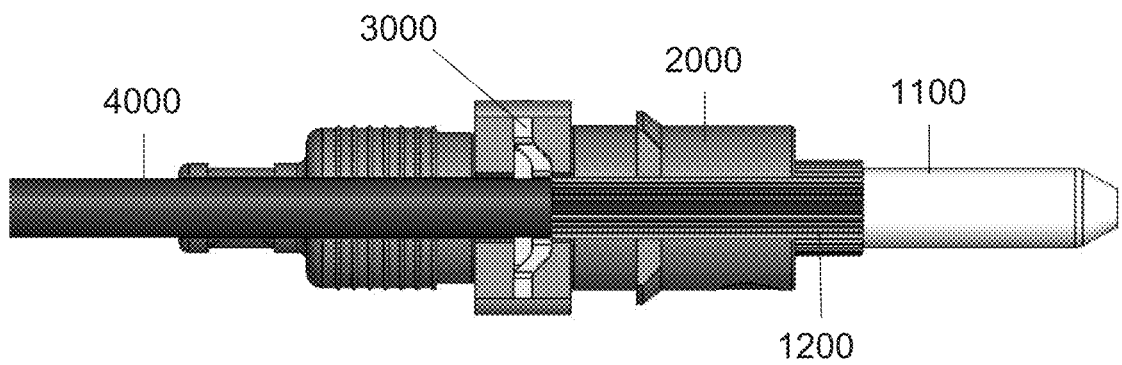
FIG. 9 is a schematic view of a rear body, with the resilient biasing clip and the ferrule inserted, in accordance with a second embodiment of the present invention.

FIG. 9 shows the SC connector rear body 2000 with the resilient biasing clip 3000 and the ferrule 4000 inserted. The ferrule holder 1200 and the termination piece 1100 are also shown. The ferrule holder 1200 comprises a plurality of grooves, indentations, or ridges 1210. This plurality of grooves 1210 extends longitudinally along the ferrule holder 1200, such that the plurality of grooves 1210 cover the majority of the surface of the ferrule holder 1200. Each of the grooves which form the plurality of grooves 1210 are parallel with one another, forming a series of linear, parallel indentations or channels which extend longitudinally along the outer surface of the ferrule holder 1200. In this connection, the asymmetric D profile of the ferrule holder 1200 is located and aligned with the corresponding section of the SC rear body 2000. This process ensures the correct orientation of the fibre optic ferrule connection is achieved and minimises angular rotation of the SC connector around the longitudinal axis of the optical fibre.

Figure 11:
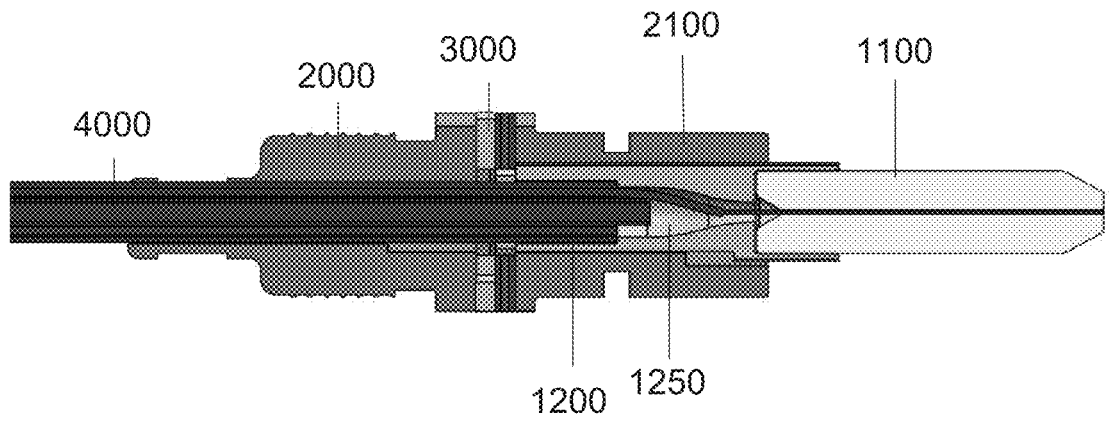
FIG. 11 is a schematic cross-sectional view of the embodiment of FIG. 9 with a housing fitted, in accordance with a second embodiment of the present invention.

FIG. 11 is a schematic cross sectional view of the embodiment of FIG. 9 with a housing 2100 fitted. This housing 2100 is connected or fixed to the SC rear body 2000 such that it surrounds the SC rear body 2000, in this case substantially enclosing part of the SC rear body 2000. The internal bore 1250 of the ferrule holder 1200, has a concave curved tapered end to guide the fibre into the termination piece 1100 with reduced stress.

Figure 12:
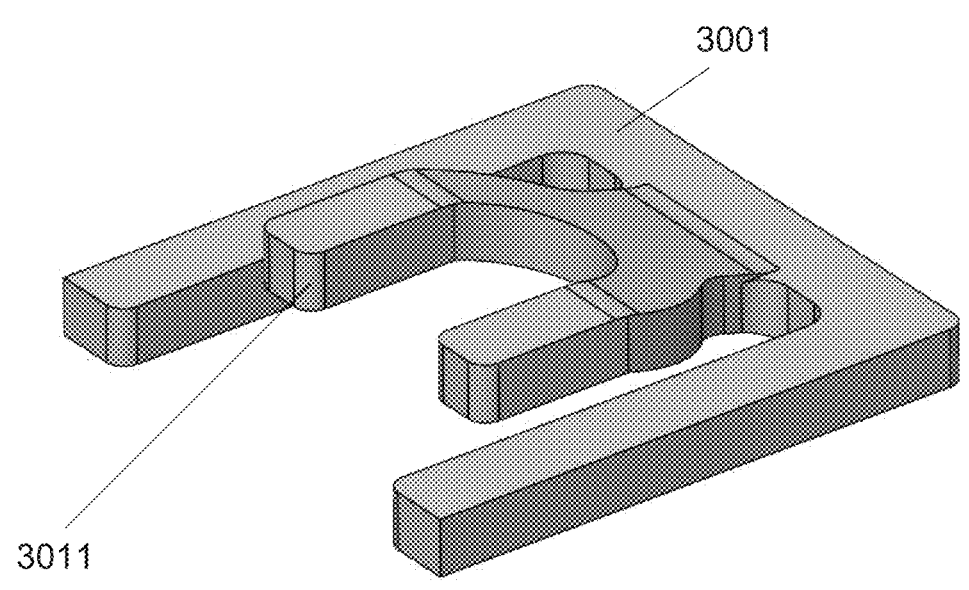
FIG. 12 is a schematic view of a resilient biasing clip, in accordance with a third embodiment of the present invention.

FIG. 12 shows a third embodiment of a resilient biasing clip 3001. The resilient biasing clip 3001 has one deflectable tine 3011. The deflectable tine 3011 is substantially Y shaped, extends from the base of the U-shape of the resilient biasing clip 3000, and is free to deflect when inserted into the SC connector rear body 2000.

No tooling is required during the assembly of the SC connector. Therefore, it may be undertaken by either the installer or the final user of the optical fibre system at the site of the installation, further increasing the ease with which the optical fibre may be installed.

What is claimed is:

1. A connector for attachment to the end of an optical fiber, comprising:
   a rear body and a resilient biasing member in the form of a resilient biasing clip comprising two deflectable tines,
   wherein the rear body comprises a longitudinal slot configured to allow a cable to be inserted,
   wherein the rear body comprises a transverse slot configured to receive the resilient biasing clip,
   wherein the resilient biasing member has a shape configured to allow a cable to be inserted the longitudinal slot,
   wherein the transverse slot of the rear body has a cross section formed of a first rectangle and second rectangle, and
   wherein the first rectangle has a greater length than the second rectangle, and the first and second rectangles both have lengths greater than a diameter of the longitudinal slot.

2. The connector of claim 1, wherein the diameter of the longitudinal slot is in the range of 0.90 to 2.00 mm.

3. The connector of claim 1, wherein the resilient biasing clip is substantially U-shaped.

4. The connector of claim 1, wherein the resilient biasing clip has a thickness in the range of 0.1 to 0.7 mm.

5. The connector of claim 1, wherein the resilient biasing member comprises stainless steel.

6. The connector of claim 1, wherein the resilient biasing member comprises beryllium copper.

7. The connector of claim 1, wherein the resilient biasing member is integrally formed in one piece.

8. The connector of claim 1, wherein the connector further comprises a ferrule holder, the ferrule holder having an internal bore.

9. The connector of claim 8, wherein the connector does not comprise a spring extending from the ferrule holder.

10. The connector of claim 8, wherein the ferrule holder comprises an internal bore and wherein the internal bore has a tapered end.

11. The connector of claim 10, wherein the tapered end of the internal bore of the ferrule holder is curved.

12. The connector of claim 11, wherein the tapered end of the internal bore of the ferrule holder is tapered in a concave curve.

13. A kit, comprising:
   the connector of claim 1;
   a fibre optic blowing accessory; and
   an installation tube,
   wherein the fibre optic blowing accessory has an outer diameter between 75% and 85% of an inner diameter of the installation tube.

\* \* \* \* \*